US007933614B2

(12) United States Patent
Sun

(10) Patent No.: US 7,933,614 B2
(45) Date of Patent: Apr. 26, 2011

(54) SHORT MESSAGE WEBSITE-ADDRESS DEVICE AND SYSTEM AND METHOD FOR IMPLEMENTING SHORT MESSAGE VALUE-ADDED SERVICE

(75) Inventor: Qian Sun, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 958 days.

(21) Appl. No.: 11/645,777

(22) Filed: Dec. 27, 2006

(65) Prior Publication Data

US 2007/0136431 A1    Jun. 14, 2007

Related U.S. Application Data

(63) Continuation of application No. PCT/CN2006/001285, filed on Jun. 12, 2006.

(30) Foreign Application Priority Data

Aug. 26, 2005  (CN) .......................... 2005 1 0096754

(51) Int. Cl.
*H04W 4/00* (2009.01)
(52) U.S. Cl. ......... 455/466; 709/203; 709/206; 709/228
(58) Field of Classification Search ................. 455/466; 709/203, 206, 228
See application file for complete search history.

(56) References Cited

U.S. PATENT DOCUMENTS

| 6,321,257 | B1 * | 11/2001 | Kotola et al. | ................. | 709/219 |
| 6,473,622 | B1 * | 10/2002 | Meuronen | ..................... | 455/466 |
| 6,961,330 | B1 * | 11/2005 | Cattan et al. | .................. | 370/352 |
| 7,478,146 | B2 * | 1/2009 | Tervo et al. | ................... | 709/220 |

| 2004/0244102 | A1 | 12/2004 | Benzon et al. | | |
| 2005/0075093 | A1 * | 4/2005 | Lei et al. | ..................... | 455/412.1 |
| 2006/0261940 | A1 * | 11/2006 | Defant et al. | ............. | 340/539.13 |

FOREIGN PATENT DOCUMENTS

| CN | 1550113 A | 11/2004 |
| CN | 1564614 A | 1/2005 |
| WO | WO 03/019959 A1 | 3/2003 |
| WO | WO 03/081860 A1 | 10/2003 |
| WO | WO 2004/082250 A2 | 9/2004 |
| WO | WO 2005/008985 A1 | 1/2005 |

OTHER PUBLICATIONS

Written Opinion of the International Searching Authority dated Sep. 14, 2006 in connection with International Patent Application No. PCT/CN2006/001285. Office Action dated Dec. 28, 2007 in connection with Chinese Patent Application No. 200510096754.2.
Partial Translation of Office Action dated Apr. 29, 2010 in connection with Chinese Patent Application No. 200680011901.4.

* cited by examiner

*Primary Examiner* — Patrick N Edouard
*Assistant Examiner* — Aung Win

(57) ABSTRACT

A short message website-address device includes a short message website-address analysis module for receiving information from a Short Message Service centre (SMS centre), determining a short message website-address and an application server address according to the information, or further determining service option information, and sending the information and the short message website-address, or the information, the short message website-address and the service option information, to a website-address access management module; the website-address access management module for receiving information from the short message website-address analysis module and sending the information to the application server according to the application server address contained in the information. The present invention also discloses a system and a method for implementing a short message Value-added Service (VAS). Thus, a user may participate in multiple short message VASs without remembering multiple fussy service numbers, which enhances the easy-to-use quality and attraction of the short message VASs.

1 Claim, 13 Drawing Sheets

US 7,933,614 B2

SHORT MESSAGE WEBSITE-ADDRESS DEVICE AND SYSTEM AND METHOD FOR IMPLEMENTING SHORT MESSAGE VALUE-ADDED SERVICE

CROSS-REFERENCE TO RELATED APPLICATIONS

This is a continuation of International Application No. PCT/CN2006/001285, filed on Jun. 12, 2006, which designated the United States; the disclosure of which is hereby incorporated by reference in its entirety.

FIELD OF THE INVENTION

The present invention is related to Value-added Service (VAS) techniques of communication systems, and more particularly, to a short message website-address device, a system and a method for implementing a short message VAS.

BACKGROUND OF THE INVENTION

At present, with the development of Short Message Service (SMS) techniques, a variety of short message VASs emerge endlessly. There are two systems for implementing short message VASs in the related art. One is shown in FIG. 1, including a terminal 101, a Short Message Service centre (SMS centre) 102 and multiple application servers 103. The application servers 103 are established after a Service Provider (SP) who wants to develop short message VASs acquires service numbers from an operator, and each of the application servers 103 corresponds to one or more service numbers and connects with networks of one or more operators. After a terminal sends a short message of which the recipient number is a service number to the SMS centre 102, the SMS centre 102 forwards the short message to an application server corresponding to the recipient number. The application server determines a service processing logic according to the short message received by the application server and implements service processing.

The other system for implementing short message VASs in the related art is shown in FIG. 2, including a terminal 101, an SMS centre 102, an Internet Short Message Gateway (ISMG) 201, and multiple application servers 103. The ISMG 201 is configured to forward messages between the SMS centre 102 and application servers 103 and to implement collection of charging information, service management and network management, etc.

An illustrative example for a specific short message VAS is described to illustrate the related art. For example, a certain interactive television program provides a service of short message participation for users. And the application server corresponding to the service corresponds to such three numbers as 96666, 86666, and 56666 and each of the numbers corresponds to a different operator, i.e., operator 1, operator 2 and operator 3. When a user subscribing with operator 1 would like to participate in the service, he/she should know the number corresponding to the service, namely 96666, and edit a short message. Upon editing the short message, the user will use a terminal to send the short message of which the recipient number is 96666 to an SMS centre. Upon receiving the short message, the SMS centre sends information to the application server corresponding to the service number 96666 directly or sends information to the application server corresponding to the service number 96666 through an ISMG. The application server determines a service processing logic corresponding to the short message received by the application server and implements the service processing.

Due to the diversification of the existing short message VASs, different short message VASs correspond to different service numbers. As a result, if a user wants to participate in multiple short message VASs, he/she should know these service numbers corresponding to such multiple short message VASs. Since such a service number is a group of numbers without image, the difficulty of remembering the service number increases. A user needs to know every service number of each short message VAS that he/she participated in; therefore the easy-to-use quality and attraction of the short message VAS decrease.

Additionally, a short message VAS provider is allowed to develop a short message VAS after acquiring a service number from an operator. However, as there are limited service number resources, a great number of institutions or enterprises can not get service numbers, which limits the development and coverage of the short message VAS.

SUMMARY OF THE INVENTION

Embodiments of the present invention provide a short message website-address device to enable a user to participate various short message VASs without remembering multiple hard-to-remember service numbers, therefore enhancing the easy-to-use quality and attraction of the short message VASs.

Embodiments of the present invention also provide a system for implementing a short message VAS to enable a user to enjoy various short message VASs without remembering multiple hard-to-remember service numbers, therefore enhancing the easy-to-use quality and attraction of the short message VAS.

Embodiments of the present invention further provide a method for implementing a short message VAS to enable a user to participate various short message VASs without remembering multiple hard-to-remember service numbers, therefore enhancing the easy-to-use quality and attraction of the short message VAS.

The short message website-address device includes:
a short message website-address analysis module, receiving information from a Short Message Service (SMS) centre, and determining a short message website-address and an application server address according to the information; and
a website-address access management module, sending the information and the short message website-address to an application server according to the application server address.

The present invention also provides a system for implementing a short message VAS. The system for implementing a short message Value-added Service (VAS) includes:
a Short Message Service (SMS) centre, receiving a short message with a recipient number from a terminal, wherein the recipient number is a universal number of a short message VAS preset in the SMS centre; and forwarding the short message;
a short message website-address device, receiving the short message from the SMS centre, determining a short message website-address according to short message contents; determining an application server according to the short message website-address and short message website-address registration information preset in the short message website-address device; and sending the short message and the short message website-address by a request message of accessing the short message website-address;
the application server, determining a service processing logic according to the short message website-address in the request message of accessing the short message website-address received from the short message website-address device; and processing a service according to the service processing logic.

The method for implementing a short message Value-added Service (VAS) includes:

sending, by a terminal, a short message with a recipient number to a Short Message Service (SMS) centre, wherein the recipient number is a universal number of the short message VAS;

determining, by the SMS centre, a short message website-address according to short message contents; determining an application server address according to the short message website-address; and sending the short message and the short message website-address to the application server by a request message of accessing the short message website-address; and determining, by the application server, a service processing logic according to the short message website-address in the request message of accessing the short message website-address; and processing a service according to the service processing logic.

It can be seen from the above technical schemes that, in the present invention, a universal number of a short message VAS is set in the SMS centre and a short message website-address device is added to the system for implementing a short message VAS. Upon receiving the short message of which the recipient number is the universal number of the short message VAS, the SMS centre sends the short message to the short message website-address device. The short message website-address device determines a corresponding application server according to the received short message, thereby users can enjoy multiple short message VASs without remembering multiple fussy service numbers, which enhances the easy-to-use quality and attraction of the short message VAS. Furthermore, since the universal number of the short message VAS is adopted, the resources problem caused by the limited service numbers is solved, which enables the CP developing short message VASs to provide short message VASs to the users easily.

In addition, according to the present invention, an access to application servers of a terminal is recorded in the short message website-address device. When the received information does not include the information of the application server, the short message website-address determines a corresponding application server according to the access record of the terminal corresponding to the received information. Thus a user does not need to edit the related information of the application server which is to be accessed in the short message each time, furthermore the convenience for the user, the easy-to-use quality and attraction of the short message VASs enhance.

DETAILED DESCRIPTION OF THE INVENTION

The present invention is hereinafter described in detail with reference to the accompanying drawings to further clarify the objectives, technical schemes and advantages of the present invention.

According to an embodiment of the present invention, a universal number is set in an SMS centre for short message VASs. Upon receiving a short message of which the recipient number is the universal number, the SMS centre determines an application server corresponding to the recipient number according to contents of the short message and sends the short message to the application server determined by the SMS centre. The application server then determines a service processing mode according to the short message received and processes the short message. The present invention may be applied in a mobile communication network or a fixed communication network.

The above process of determining an application server corresponding to the recipient number according to contents of the short message may be implemented by a short message website-address device added into the SMS centre or a short message website-address device which is set separately.

Specific exemplary embodiments are described hereinafter with reference to accompanying drawings.

Figure 1:
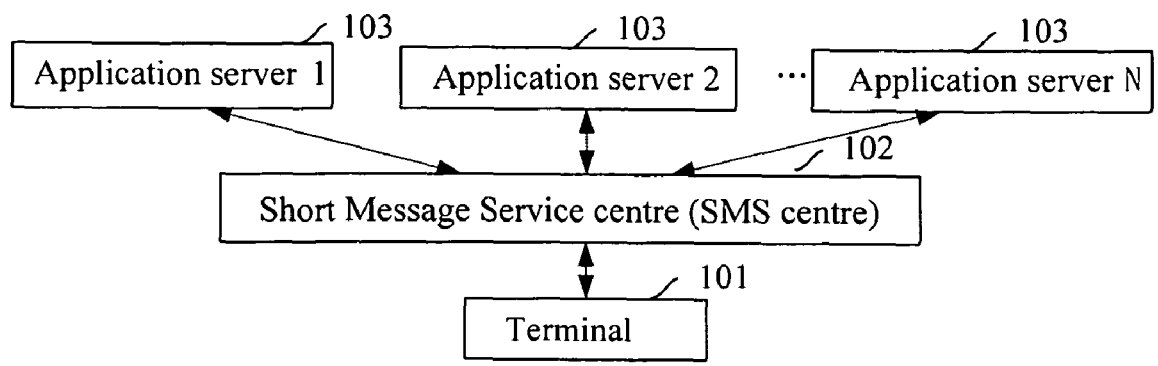
FIG. 1 is a schematic diagram illustrating the conventional structure of a system for a short message VAS.
Figure 2:
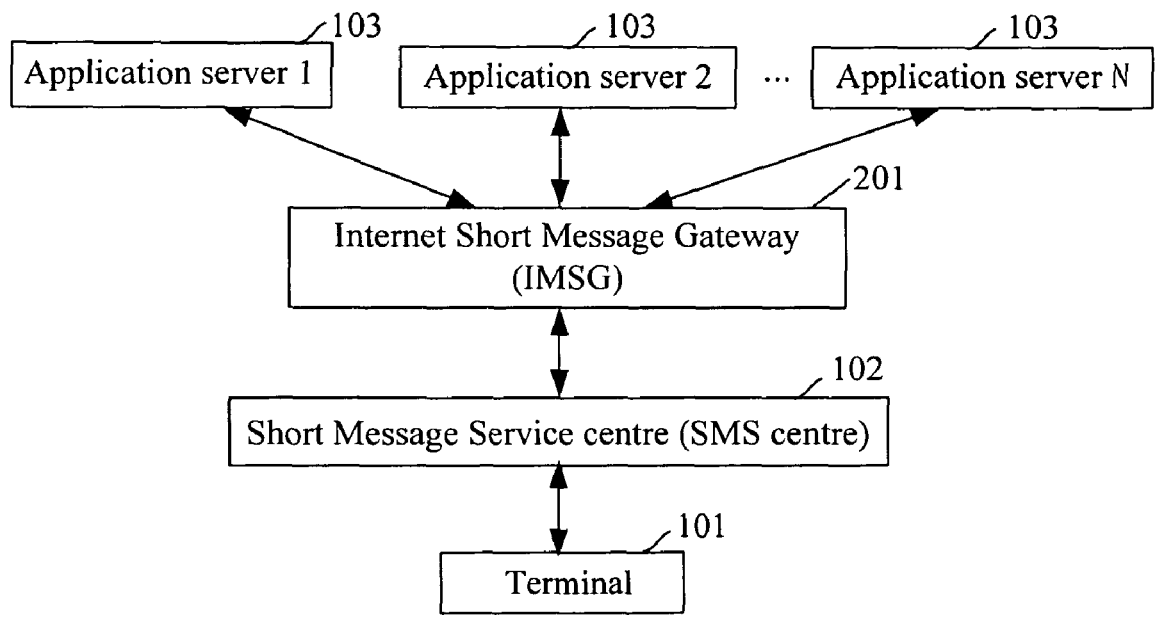
FIG. 2 is a schematic diagram illustrating the conventional structure of another system for a short message VAS.
Figure 3:
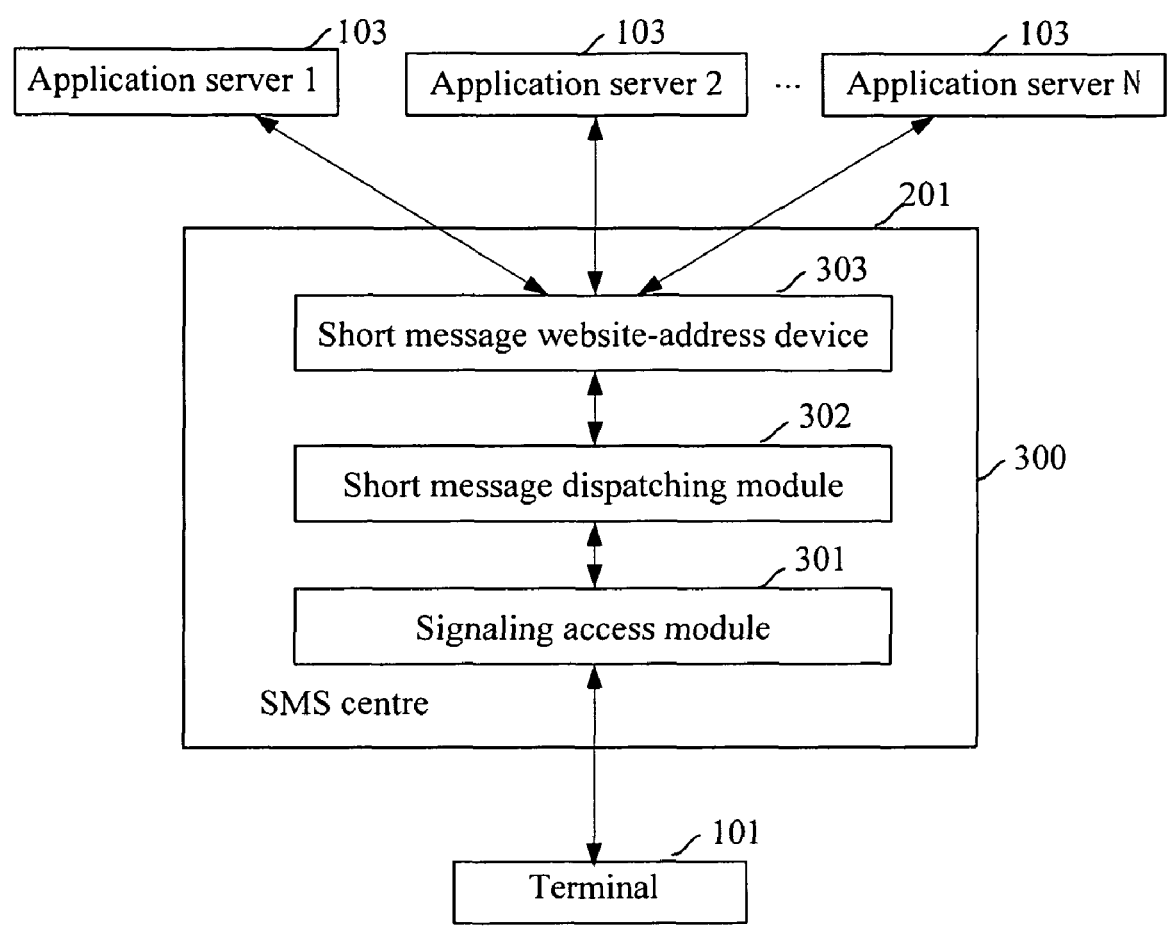
FIG. 3 is a schematic diagram illustrating the structure of a system of a first embodiment in the present invention.

A system according to a first embodiment in accordance with the present invention is shown in FIG. 3, including a terminal 101, an SMS centre 300 and application servers 103.

The terminal 101 is used for generating a short message of which the recipient number is a universal number of a short message VAS and contents include information related to the short message website-address, and sending the short message to the SMS centre 300. And the short message website-address is an identifier corresponding to service contents of a certain specific short message VAS, and different short message website-address corresponds to different service contents of a short message VAS respectively. The identifier is generally in text format such as company A, company B, company C, etc., or is a numeral such as 119, 120 and the like. After registered, a short message website-address is stored in a short message website-address device. The information related to the short message website-address may be an exact registered short message website-address or fuzzy information such as today's weather or a company introduction, etc. Service option information may also be included in the contents of the short message edited by a user, for example, the contents of the short message may be as "short message website-address, a blank space, service option 1, a blank space and service option 2".

The SMS centre 300 is used for receiving the short message from the terminal 101, determining an application server corresponding to the recipient number according to contents of the short message upon identifying that the recipient number in the short message is the universal number corresponding to a short message VAS, and sending the short message received by the SMS centre to the application server determined by the SMS centre. The SMS centre 300 includes a signaling access module 301, a short message dispatching module 302, and a short message website-address device 303.

The signaling access module 301 is used for exchanging signaling between the SMS centre and a network device such as a Mobile Switching Centre (MSC) or a Home Location Register (HLR), performing a signaling access for exchanging information between the terminal and the SMS centre, and sending the signaling to a short message dispatching module 302 upon the signaling is converted to information in the internal format.

The short message dispatching module 302 is used for scheduling, storing and forwarding a short message. And it is also used for determining whether the recipient number of the short message from the signaling access module 301 is a preset universal number of the short message VAS, if yes, the short message dispatching module 302 sends the short message received to the short message website-address device 303. Since the recipient number becomes useless after it is determined as the universal number of the short message VAS, the information which is sent to the short message website-address device 303 by the short message dispatching module 302 may be that of the short message received without the recipient number thereof.

The short message website-address device 303 is used for determining a short message website-address corresponding to contents of the short message in the information sent from the short message dispatching module 302, determining an application server address corresponding to the short message website-address, and sending the short message website-address and the information received by the short message website-address device to an application server corresponding to the application server address by a request message of accessing the short message website-address.

Short message website-address registration information, i.e. information of the relationship between a short message website-address and an application server address, is stored in the short message website-address device 303 in advance, which is shown in Table 1. Thus, upon receiving the information from the SMS centre, the short message website-address device determines whether the contents of the short message include the short message website-address shown in Table 1, if yes, an application server address corresponding to the contents of the short message is found according to the short message website-address.

In addition, in this embodiment, a record for the terminal 101 accessing the short message website-address may be preset in the short message website-address device 303, which is shown in Table 2.

TABLE 1

| Short message website-address | Application server address |
|---|---|
| Weather forecast | 10.10.10.101 |
| Company A | 10.10.10.102 |
| Company B | 10.10.10.102 |
| ... | ... |

TABLE 2

| Short message website-address | Terminal number | Time |
|---|---|---|
| Weather forecast | 13048907033 | 2005-6-16:14:30:21 |
| Weather forecast | 13048907033 | 2005-6-17:09:31:00 |
| Company A | 13048907033 | 2005-6-17:15:30:01 |
| Company A | 13760463639 | 2005-6-14:11:31:01 |

After a record for the terminal 101 accessing the short message website-address is set in the short message website-address device 303, if the terminal 101 continuously sends short messages to acquire service contents provided by the same short message website-address, a user only needs to include the information related to the short message website-address in the contents of a first short message, while sending subsequent short messages, the user only needs to include service option information corresponding to the short message website-address in the contents of the short messages. Upon receiving the information sent from the short message dispatching module 302, the short message website-address device 303 determines whether the contents of the short message include the information related to the short message website-address. If no, the short message website-address device 303 further inquires about whether there is a record for the terminal 101 accessing the short message website-address, if there is the record, the short message website-address device 303 acquires the short message website-address which is accessed by the terminal 101 last time, and determines an application server address corresponding to the short message website-address, and sends the short message website-address acquired and the information received to an application server corresponding to the application server address determined; otherwise, if there is not the record, the short message website-address device 303 returns a failure indication to the terminal 101. Otherwise, if the contents of the short message include the information related to the short message website-address, the short message website-address device 303 acquires the application server address corresponding to the short message website-address according to the information related to the short message website-address.

Furthermore, the short message website-address device 303 may determine a service option according to the contents of the short message received by it. For example, if the contents of the short message sent from the terminal 101 are company A, a blank space and 1, the short message website-address device determines a short message website-address according to company A. In this process, the short message website-address is assumed to be company A. And an application server address is determined according to the short message website-address company A, herein, it is assumed to be 10.10.10.102. The short message website-address device determines that there is a blank space in the short message and a numeral following the blank space, thus the numeral is regarded as the service option. That the short message website-address is company A and that the service option is "1" are sent to the application server 10.10.10.102 that is determined according to the short message website-address company A.

The application server 103 is used for receiving the request message of accessing the short message website-address from the short message website-address device 303, determining a service processing logic according to the request message of accessing the short message website-address, and processing the service according to the service processing logic. An application server may correspond to one or more short message website-addresses.

The request message of accessing the short message website-address from the short message website-address device 303 includes the short message website-address information or further includes the service option information, the application server 103 determines a service processing logic and a sub-processing logic according to the short message website-address information or the short message website-address information and service option information, and implements the service processing according to the service processing logic and the request message of accessing the short message website-address. Upon the service processing, if a processing result is generated for the terminal 101, the processing result will be returned to the terminal 101 through the SMS centre 300.

Upon returning the processing result to the terminal 101 via the SMS centre 300, the application server 101 may generate a short message containing the processing result and send the short message to the short message dispatching module 302 of the SMS centre 300. The short message dispatching module 302 forwards the short message to the signaling access module 301, which sends the short message to the terminal 101. As the detailed implementation of the above process is the same as that in the related art, only one example is described briefly hereinafter. Alternatively, upon returning the processing result to the terminal 101 via the SMS centre 300, the application server 103 may also send the processing result to the short message website-address device, which generates a corresponding short message and sends the corresponding short message to the short message dispatching module 302, the short message dispatching module 302 sends the corresponding short message to the terminal 101 via the signaling access module 301.

Figure 4:
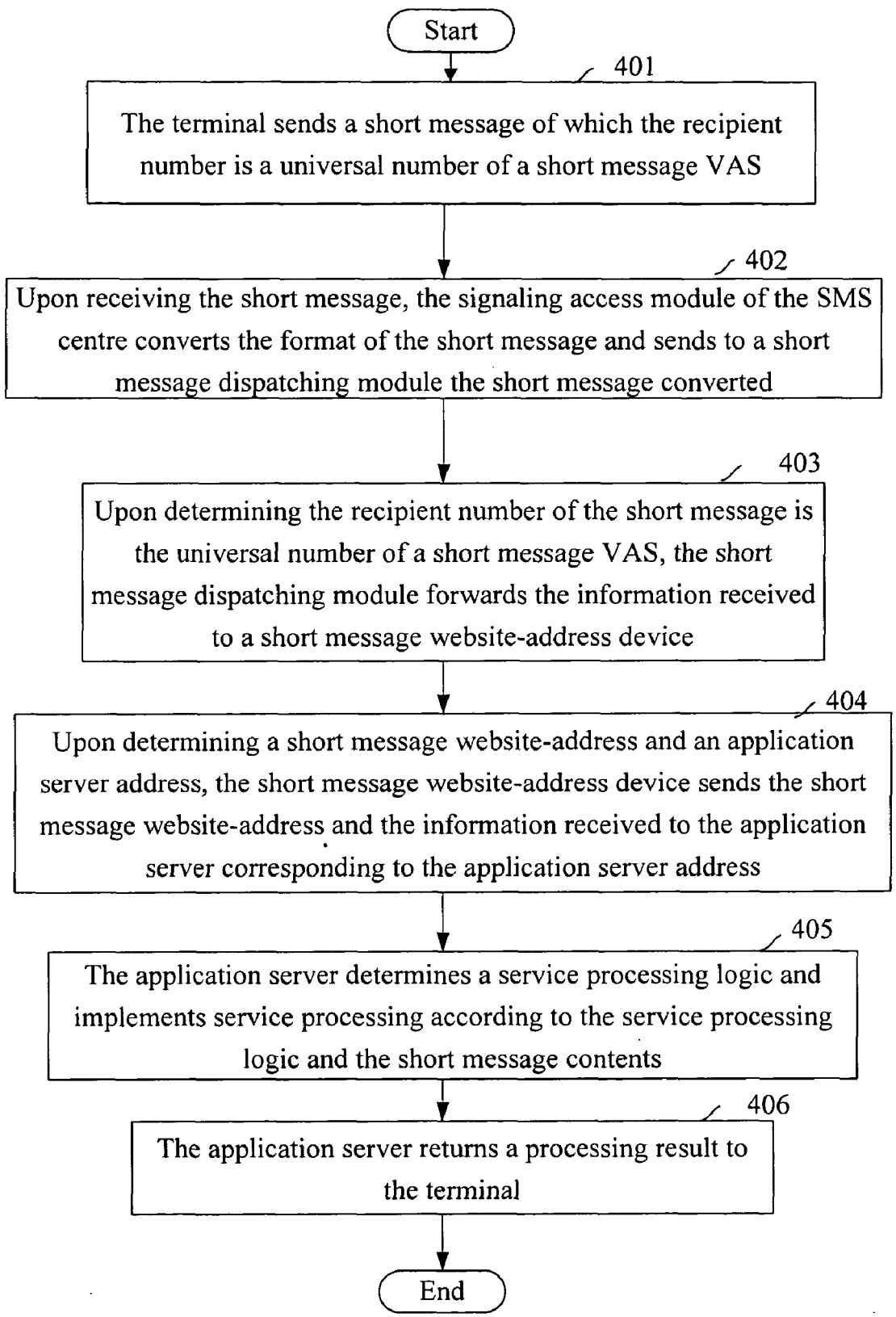
FIG. 4 is a flowchart of the first embodiment in the present invention.

The process for implementing a short message VAS based on the above system is illustrated in FIG. 4, and the detailed descriptions of the process are given below.

Process 401: the terminal sends the SMS centre a short message of which the recipient number is a universal number of a short message VAS, and the short message includes information related to a short message website-address which is to be accessed by the terminal.

Process 402: upon receiving the short message, the signaling access module of the SMS centre converts the format of the short message and sends the short message converted to the message dispatching module.

Process 403: the short message dispatching module forwards the short message to the short message website-address device upon determining that the recipient number is the universal number of the short message VAS according to the short message received from the signaling access module.

Process 404: upon receiving the short message from the short message dispatching module, the short message website-address device determines a short message website-address according to the contents of the short message and the registration information of the short message website-address stored previously, and determines an application server address according to the short message website-address. Furthermore, the short message website-address device may also determine a service option according to the contents of the short message, and send the short message website-address determined and the short message received, or further send service option information, to an application server which corresponds to the application server address by the request message of accessing the short message website-address.

When a user edits contents of a short message, the short message website-address provided may not be exact, so the short message website-address device may adopt a word-matching method to determine whether the contents of the short message include the short message website-address contained in the short message website-address registration information. The word-matching method may be that the short message website-address which has the most Chinese characters that are sequentially identical with the Chinese characters within the contents of the short message will be chosen as the corresponding short message website-address. Taking a short message edited in Chinese as an example, the contents of the short message received by the short message website-address device, are "tian qi zen yang" in Chinese (means what about the weather, in English), upon inquiring the registration information of the short message website-address according to the contents, the short message website-address device finds two short message website-addresses possibly to be matching which are "tian qi yu bao" (means weather forecast in English) and "tian ran qi" (means natural gas in English), because in the "tian qi yu bao", there are two Chinese characters that are sequentially identical with the Chinese characters in the "tian qi zen yang" that are the contents of the short message, and in the "tian ran qi", there is one Chinese character that is sequentially identical with the Chinese character in the tian qi zen yang", the short message website-address device chooses the short message website-address of which the contents are "tian qi yu bao" as the short message website-address, sends the short message website-address which is included in a request message of accessing the short message website-address to the application server which corresponds to the short message website-address "tian qi yu bao".

If there are multiple short message website-addresses determined each of which has Chinese characters that are sequentially identical with the Chinese characters within the contents of the short message, the short message website-address device may, according to the record for the terminal accessing the short message website-address, choose the one which is accessed by the terminal latterly as the short message website-address from the above multiple short message website-addresses; or, according to a number of times of accessing the short message website-address recorded previously, choose the one of which the number of times is the biggest as the short message website-address, as the short message website-address of the biggest number of times is generally the one that the user desires to access.

If the short message website-address provided by the terminal is not exact, the short message website-address device may further return one or more related short message website-addresses to the terminal according to a predetermined rule. For instance, contents of a short message from the terminal are "tian qi" in Chinese (means weather in English), the short message website-address device has not found a short message website-address which is "tian qi" but two short message website-addresses including the two Chinese characters "tian qi", one is "jin ri tian qi" in Chinese (means today's weather in English) and the other one is "ming ri tian qi" in Chinese (means tomorrow's weather in English). The short message website-address device will return a short message of which the contents are "tian qi hai mei you bei zhu ce wei duan xin wang zhi, nin ke yi fang wen "jin ri tian qi" huo zhe "ming ri tian qi"" in Chinese (means that the "weather" has not been registered as a short message website-address, you may access these two short message website-addresses related with the "weather" as "today's weather" or "tomorrow's weather" in English). The predetermined rule above may either be the simple-including rule as described above, or be a corresponding relation of the key words between the short message website-address and the non-short-message website-address. If the short message website-address device may not exactly determine the short message website-address according to the contents of the short message, it may determine related short message website-addresses according to the corresponding relation, that is, determine the corresponding related short message website-addresses by searching the corresponding relation according to the contents of the short message or the key words in the corresponding relation. For example, the key words corresponding to the short message website-address "tian qi yu bao" (means weather forecast in English) recorded in the short message website-address device are "tian qi" (means whether in English), "qi xiang" (also means weather in English), and "qi wen" (means temperature in English), thus, when the contents of the short message received are one of the three key words above such as "qi wen", the short message website-address device determines "tian qi yu bao" (means weather forecast in English) as the short message website-address according to the corresponding relation.

When the short message website-address device returns the contents including related short message website-address, in order to further make it more convenient for a user to enjoy a service, that is to make it unnecessary for the user to input the complete short message website-address again but only numbers or characters such as 1, 2, a, b and the like to access the short message website-address, the short message website-address device saves a record for the access information of the terminal, including the terminal number, the related short message website-address and corresponding options and access time, etc., and returns the short message of which the contents includes option information to the terminal, such as "tian qi hai mei you bei zhu ce wei duan xin wang zhi, nin ke yi fang wen 1 "jin ri tian qi" 2 "ming ri tian qi"" in Chinese (means that the "weather" has not been registered as a short message website-address, you may access two short message website-address related with the "weather" as "today's weather" by inputting "1" or "tomorrow's weather" by inputting "2" in English)". Therefore, if the contents of the short message received only include a numeral or a letter option, the short message website-address device searches the record for the access information to determine the short message website-address corresponding to the option in the contents of the short message recorded in the latest access information of the terminal, and sends a request message of accessing the short message website-address to the application server corresponding to the short message website-address.

Process 405: upon receiving the request message of accessing the short message website-address from the short message website-address device, the application server determines a service processing logic according to the short message website-address in the request message of accessing the short message website-address and processes the service according to the service processing logic determined by the application server and the contents of the short message. In this process, if the request message received by the application server for accessing the short message website-address further includes the service option information, the application server will determine a corresponding sub-processing logic according to the service option information upon determining the service processing logic.

Figure 4A:
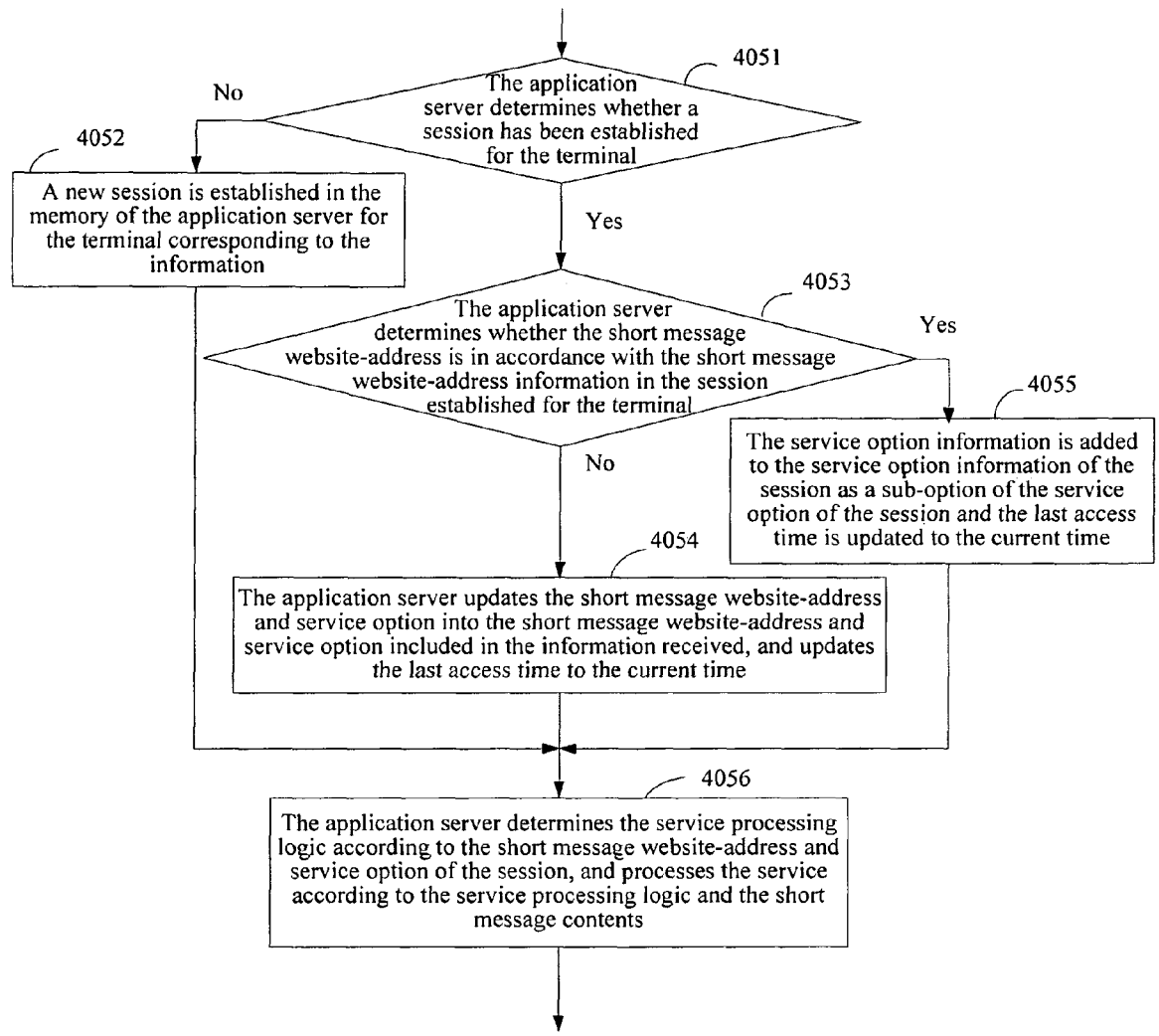
FIG. 4a is a flowchart of Process 405 using a session mode in FIG. 4.

In Process 405, if the service options corresponding to the short message website-address have multiple layers, the application server may use a session to manage an access to the short message website-address, which makes it possible to directly use an upper-layer service option determined previously when processing a lower-layer service option, thereby reducing the operations of the application server. As shown in FIG. 4a, in Process 4051, upon receiving the information from the short message website-address device, the application server determines whether or not a session has been established for the terminal according to the terminal information in the information received. If the session has not been established, perform Process 4052 in which a second session is established in the memory of the application server for the terminal corresponding to the information, and contents of the second session include a session ID, terminal information, establishing time and a short message website-address, or further include service option information and last access time, then perform Process 4056.

Otherwise, if the session has been established, perform Process 4053 in which the application server determines whether or not the short message website-address in the information from the short message website-address device is in accordance with the short message website-address information in the session established for the terminal. If the short message website-address is not in accordance with the one in the session, perform Process 4054 in which the application server updates the short message website-address into the one included in the information received subsequently, and if the information received includes a service option, the application server also updates the service option of the session into the service option received and updates the last access time to the current time; alternatively, the application server may delete the session and establish a second session including the short message website-address and service option in the information received subsequently, and perform Process 4056. Otherwise, if the short message website-address is in accordance with the one in the session, perform Process 4055 in which if the information received includes service option information, the service option information is added to the service option information of the session as a sub-option of the service option of the session and the last access time is updated to the current time; if the information received does not include service option information, the last access time is updated to the current time only, then perform Process 4056. In Process 4056, the application server determines a service processing logic according to both the short message website-address and the service option in the session, and processes the service according to the service processing logic and the contents of the short message.

In Process 405, the session may be deleted when the interval between the last access time of the session and the current time reaches a predetermined session existing period of time.

In Process 405, the processing according to the service processing logic may be only implemented in the application server without returning the processing result to the terminal. Thus this short message VAS is terminated at Process 405. Additionally, the processing according to the service processing logic may further include the process of generating the processing result to be returned to the terminal upon the processing in the application server, therefore there should further be Process 406 following Process 405.

Process 406: the application server sends the processing result generated to the terminal.

In this embodiment, after generating the processing result to be returned, the application server may send the processing result to the short message dispatching module of the SMS centre directly, which then sends the processing result to the terminal via the signaling access module. Or the application server firstly sends the processing result generated to the short message website-address device, which then forwards the processing result to the short message dispatching module, and then the dispatching module sends the processing result to the terminal via the signaling access module.

Furthermore, when the application server sends the information to the short message website-address device to be forwarded to the short message dispatching module, the short message website-address device may manage the service of short message website-address. For example, filtered keywords may be set in the short message website-address device in advance, upon receiving the information from the application server, the short message website-address device determines whether or not the information includes a filtered keyword, if so, the information will be dropped and not be sent to the terminal.

The foregoing is a description of the first embodiment in accordance with the present invention. In this embodiment, the short message website-address device is set in the SMS centre. As a result, the SMS centre will be modified greatly. In order to reduce the modification for the SMS centre, in a second embodiment of the present invention, the short message website-address device is set as a separate one, which will be described hereinafter.

Figure 5:
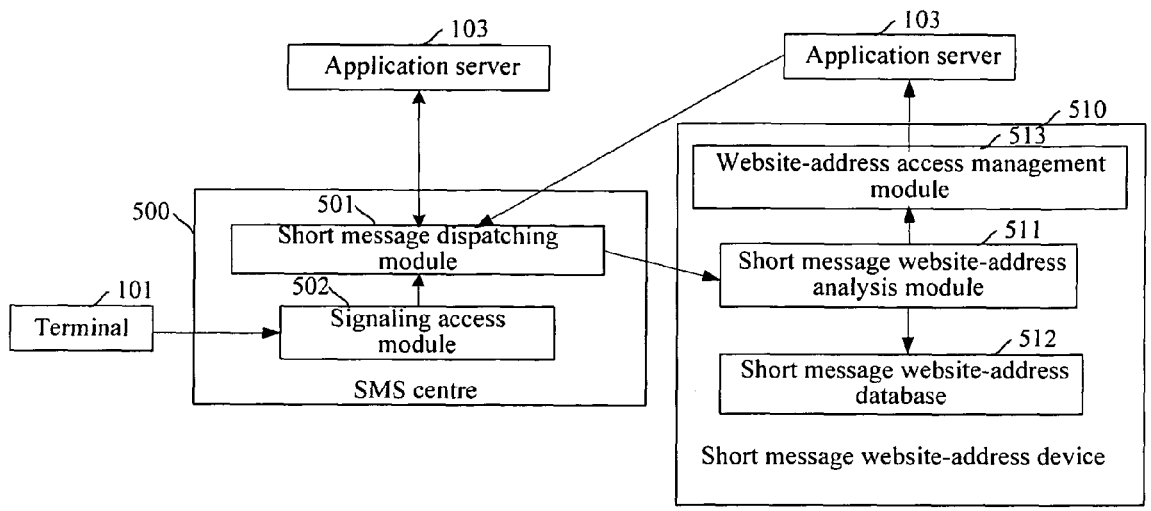
FIG. 5 is a schematic diagram illustrating the structure of a system of a second embodiment in the present invention.

The schematic diagram illustrating the structure of a system of the second embodiment according to the present invention is shown in FIG. 5. What is different from the first embodiment is that there are a short message dispatching module 501 and a signaling access module 502 in the SMS centre 500 but not a short message website-address device. The functions of the short message dispatching module 501 and the signaling access module 502 are basically the same as the functions described in the first embodiment, herein the short message dispatching module 501 sends the information received to a short message website-address analysis module 511 in a short message website-address device 510 after identifying that the recipient number in the information from the signaling access module 502 is a universal number corresponding to a short message VAS.

Furthermore, in this embodiment, a separate short message website-address device 510 is added, which includes a short message website-address analysis module 511, a short message website-address database 512, and a website-address access management module 513. The internal structure of the short message website-address device of the first embodiment may also the same as that illustrated in this embodiment.

The short message website-address database 512 is used for storing short message website-address registration information, short message website-address access record information and the like. The short message website-address analysis module 511 is used for receiving information from the short message dispatching module 501 in the SMS centre 500, determining a short message website-address and an application server address according to contents of the short message and the short message website-address registration information in the information received, and sending the short message website-address, the application server address and the information received from the short message dispatching module 501, or further sending the service option information determined, to the website-address access management module 513. The website-address access module 513 is used for sending the short message website-address, the information received from the short message dispatching module 501, or further sending the service option information, to the application server 103 corresponding to the application server address by a request message of accessing the short message website-address according to the application server address from the short message analysis module 511.

In this embodiment, upon receiving the request message of accessing the short message website-address from the website-address access management module 513 of the short message website-address device 510, the application server 103 implements the same processes as illustrated in the first embodiment, so there is no more description. In addition, in this embodiment, the processing result generated by the application 103 may be sent to the short message dispatching module 501 directly through an exterior interface of the short message dispatching module in the SMS centre 500 and sent to the terminal via the signaling access module 502. And these techniques are the same as the techniques for returning the processing result to the terminal in the related art. Alternatively, the processing result may also be sent to the short message dispatching module 501 of the SMS centre 500 via the website-address management module 513 and the short message website-address analysis module 511 in the short message website-address device 510, and sent to the terminal 101 via the signaling access module 502.

Figure 5A:
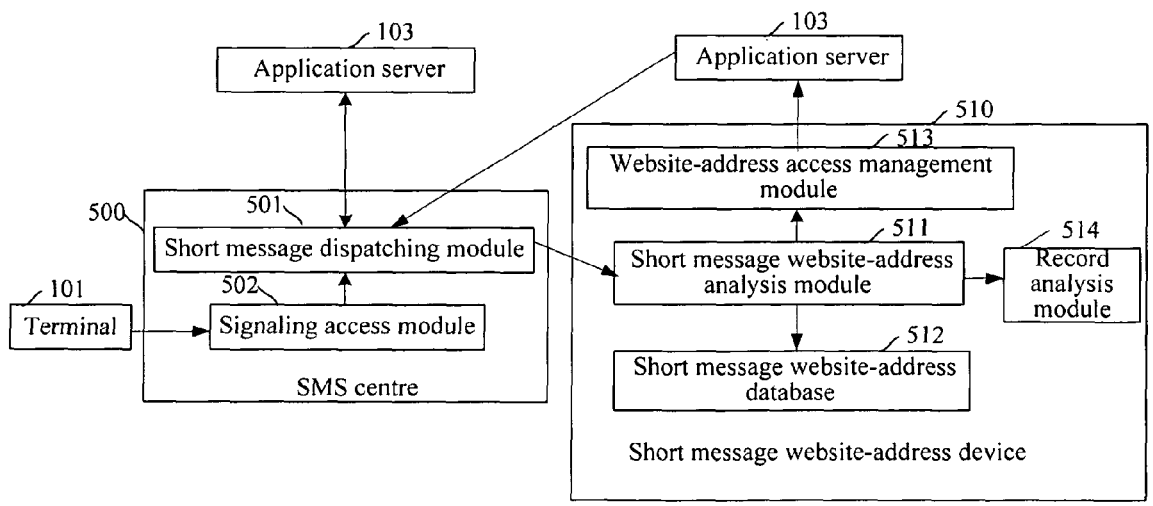
FIG. 5a is a schematic diagram illustrating the structure of another system of the second embodiment in the present invention.

Moreover, in this embodiment, the short message website-address device may record an access to the short message website-address, and the record information includes a visitor ID, a short message website-address, access time and the like. As shown in FIG. 5*a*, a record analysis module 514 is added to the short message website-address device. Thus, upon receiving the information from the short message dispatching module or the application server, the short message website-address analysis module 511 sends the record information in the information received to the record analysis module 514, which stores the record information and carries out a statistical analysis using the record information, for example, carrying out the statistical analysis on access times of a certain short message website-address in a certain period. In order to distinguish flow-direction types of the information from the short message dispatching module and the application server, i.e. from the terminal to the application server or from the application server to the terminal, an information flow-direction type may be included in the record information to record the flow-direction of the information, thereby it is possible to carry out a statistical analysis respectively for the information from different flow-directions.

Figure 6:
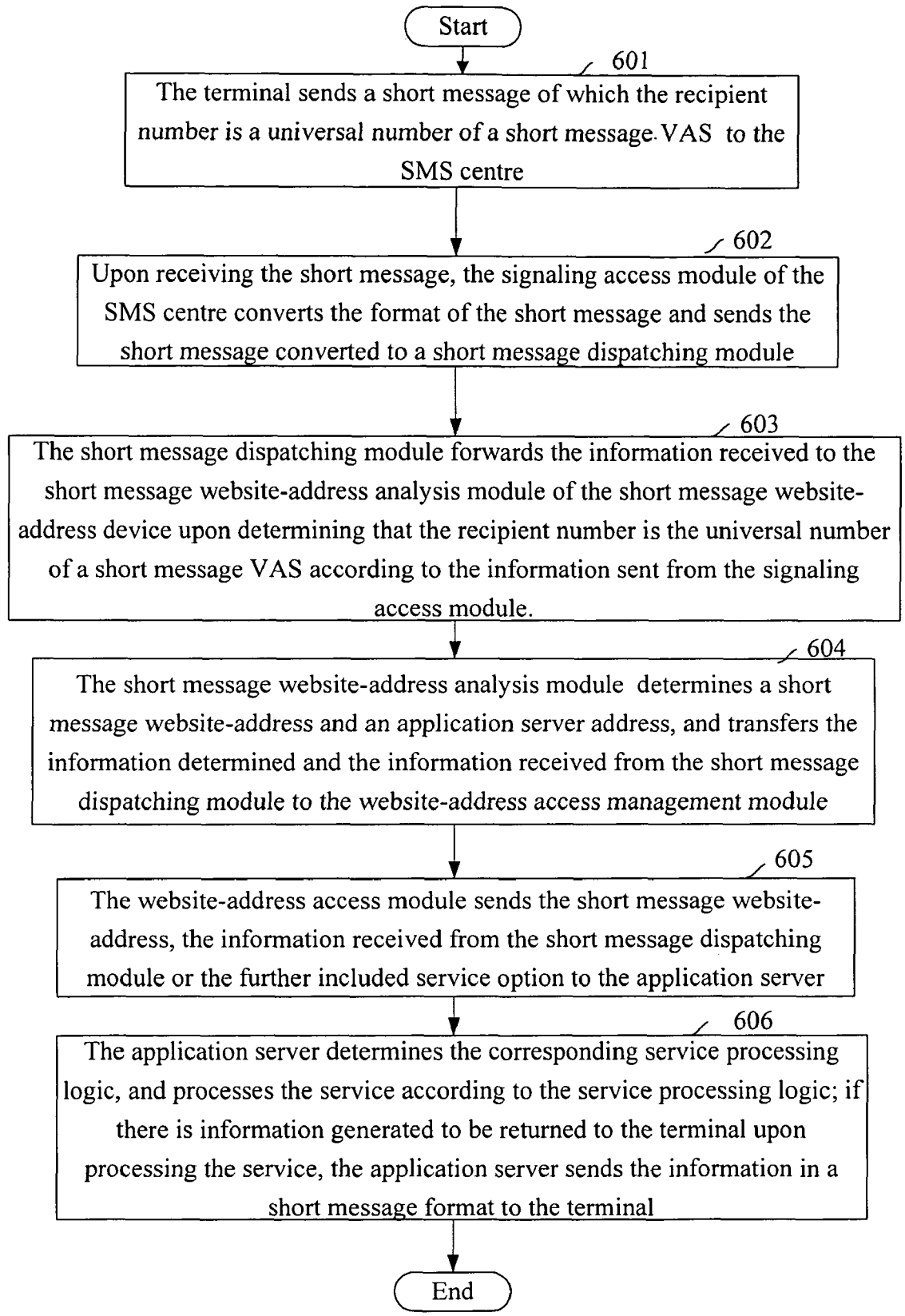
FIG. 6 is a flowchart of the second embodiment in the present invention.

The flowchart of this embodiment is shown in FIG. 6. Processes 601 and 602 are the same as the Processes 401 and 402 shown in FIG. 4. In this embodiment, Process 603 will be performed following Process 602. In Process 603, the short message dispatching module forwards the information received to the short message website-address analysis module of the short message website-address device upon determining that the recipient number is a universal number corresponding to a short message VAS according to the information sent from the signaling access module.

In Process 604, the short message website-address analysis module determines a short message website-address and an application server address according to both the contents of the short message in the information received and the short message website-address registration information upon receiving the information from the short message dispatching module 501 of the SMS centre, and transfers the short message website-address, the application server address and the information received from the short message dispatching module to the website-address access management module. In this process, the short message analysis module may further determine a service option according to the contents of the short message, and send the service option determined to the short message website-address access management module.

Figure 6A:
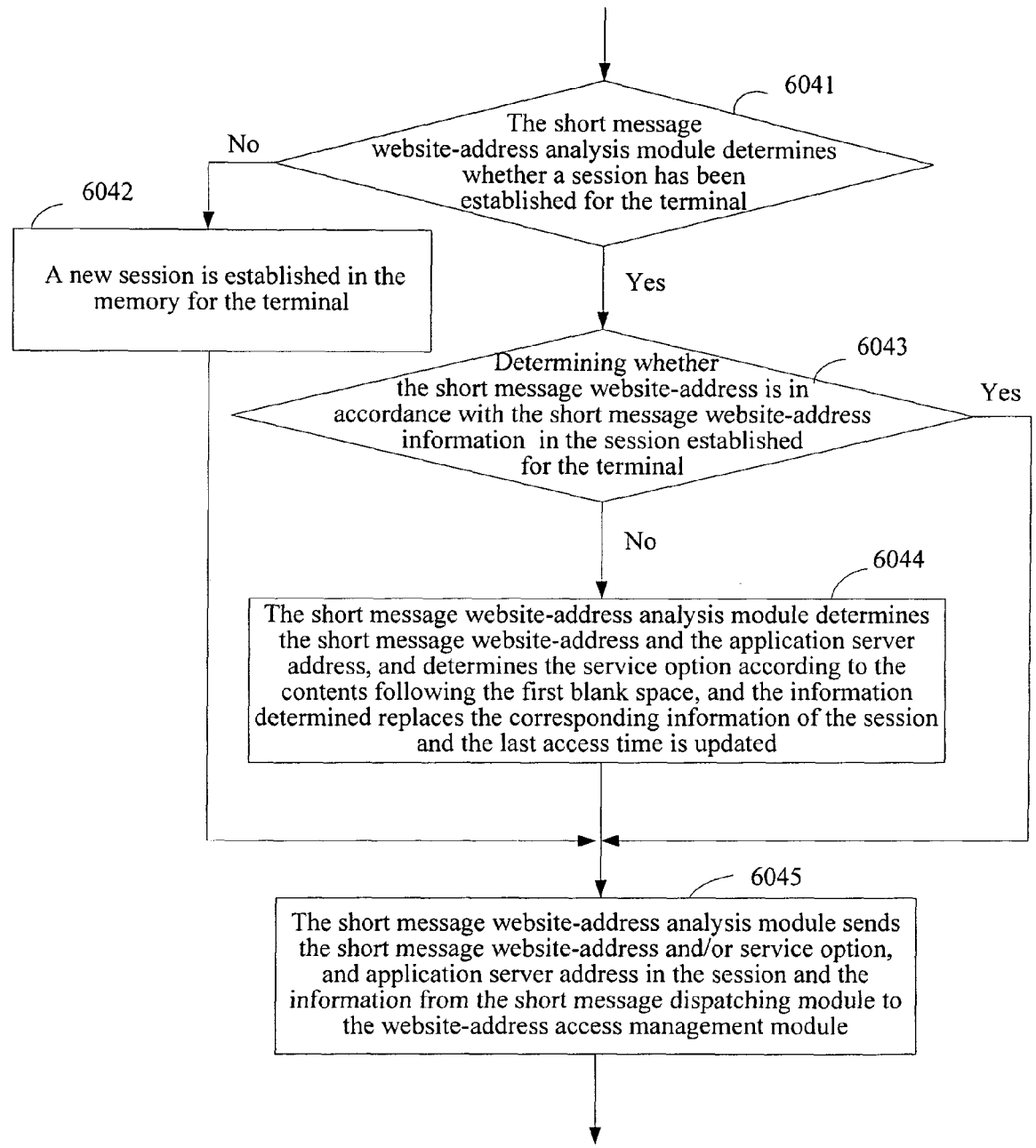
FIG. 6a is a flowchart of implementing Process 604 using a session mode in FIG. 6.

In this process, during determining an application server address, the short message website-address analysis module also may use the application server address which has ever been determined as the application server address for the terminal according to the short message website-address without inquiring about the short message website-address registration information every time. The process mentioned above may be implemented by a session mode. As shown in FIG. 6a, in Process 6041, upon receiving the information from the short message website-address device, the short message website-address analysis module determines whether a session has been established for the terminal according to the terminal information in the information received. If no, perform Process 6402 in which a second session will be established in the memory for the terminal corresponding to the information received, and contents of the session include a session ID, terminal information, establishing time and last access time; moreover, when the short message website-address, the application server address and the service option are determined by interaction with the short message website-address database, they are added to the second session and the information received is sent to the website-address management module. Otherwise, if the session has been established, in Process 6043, the short message website-address module determines whether the contents of the short message or the contents before a first blank space of the short message are the same as the short message website-address stored in the session. If yes, perform Process 6045; otherwise, in Process 6044, the short message website-address analysis module determines the short message website-address and the application server address according to the contents before the first blank space of the short message, and determines a service option according to the contents following the first blank space of the short message, and the short message website-address, the application server address and the service option replace corresponding information in the session of the terminal and the last access time is updated. In the Process 6045, the short message website-address analysis module determines a service option according to the contents following the blank space of the short message, and sends the short message website-address, the service option, the application server address in the session and the information received from the short message dispatching module to the website-address access management module.

In addition, an existing period of time may be set for each session in this process, thus, a session will be deleted if it has not been accessed when the existing period of time goes by.

Process 605: the website-address access management module sends the short message website-address, the information received from the short message dispatching module, or further sends the service option, to the application server corresponding to the application server address included in the information from the short message analysis module.

Process 606: upon receiving the information from the short message website-address device, the application server determines a service processing logic according to the short message website-address, or according to the short message website-address and service option information, and processes the service according to the service processing logic determined and the contents of the short message. If there is information generated to be returned to the terminal after processing, the application server sends the information generated to the terminal in a short message format.

In this process, a processing result generated by the application server may be directly sent to the short message dispatching module through an exterior interface of the short message dispatching module of the SMS centre. And, the short message dispatching module sends the processing result to the terminal via the signaling access module. Or the processing result may be sent to the short message dispatching module of the SMS centre via the website-address access management module of the short message website-address device, the short message dispatching module sends the processing result to the terminal via the signaling access module.

In this embodiment, the short message website-address analysis module of the short message website-address device may also record an access to the short message website-address, implement statistical analysis according to the record. The detailed implementation of this process may refer to the first embodiment, so there is no more description.

Figure 7:
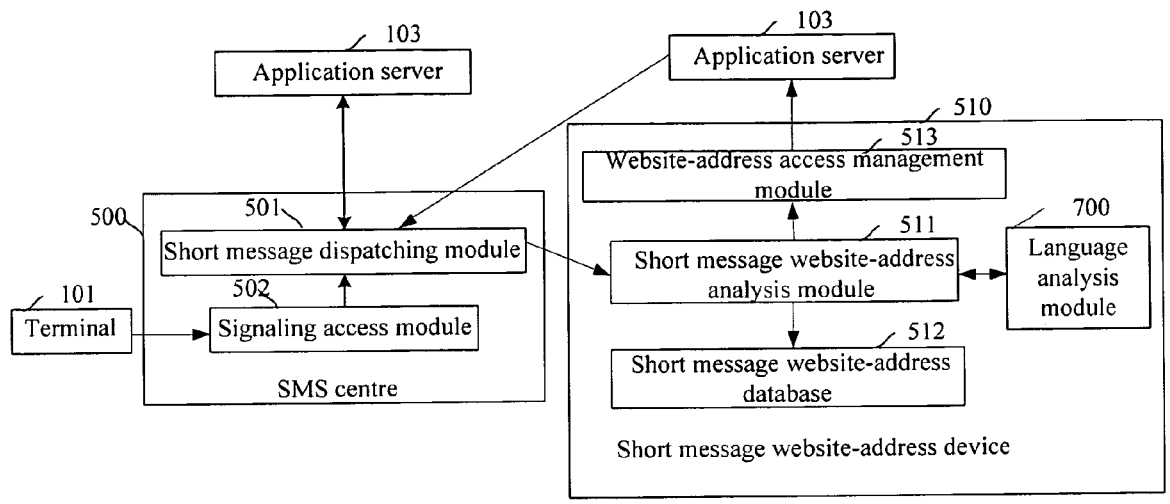
FIG. 7 is a schematic diagram illustrating the structure of a system where a language analysis module is added to the short-message website-address device of a third embodiment in the present invention.

In a third embodiment in accordance with the present invention, a language analysis module is added to the short message website-address device to determine a headword of the contents of the short message received by the short message website-address device. As shown in FIG. 7, this embodiment is described based on the second embodiment. In FIG. 7, upon receiving the information from the short message dispatching module 513, the short message analysis module 511 of the short message website-address device sends the contents of the short message to the language analysis module 700. Upon receiving the contents of the short message, the language analysis module 700 analyzes the contents of the short message and determines a headword corresponding to the contents of the short message. For example, with respect to the contents of a short message which are "ming tian tian qi zen me yang" in Chinese (means what about the weather tomorrow in English), the language analysis module 700 divides the contents of the short message into words according to a vocabulary list, which are "ming tian" (means tomorrow in English), "tian qi" (means weather in English), and "Zen me yang" (means what about in English). The "tian qi" (means weather in English) is determined as the headword according to the grammar regulation. Upon determining the headword, the language analysis module 700 returns the headword determined to the short message website-address analysis module 511. The short message website-address analysis module 511 determines a short message website-address by interaction with the short message website-address database 512 according to the headword.

Figure 8:
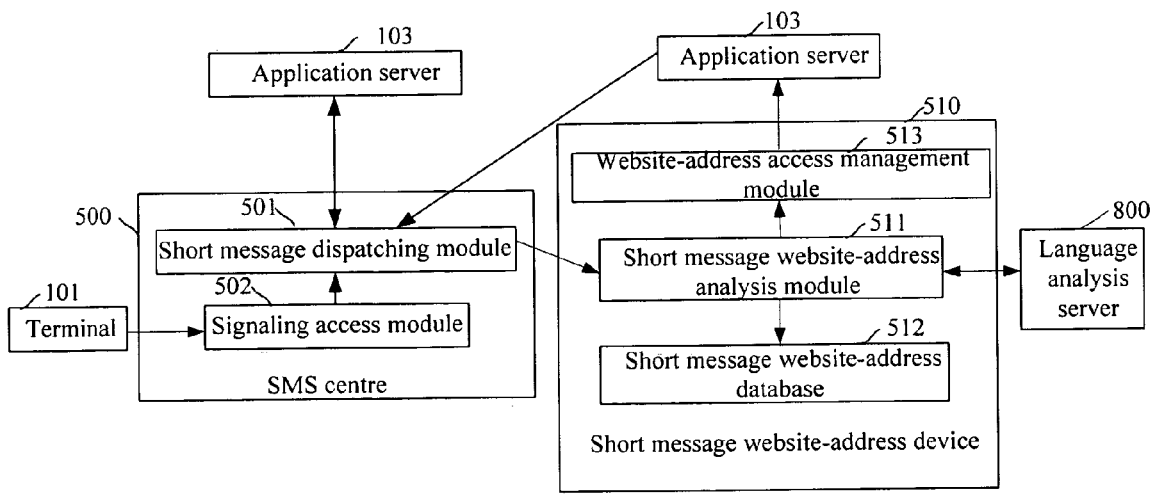
FIG. 8 is a schematic diagram illustrating the structure of a system having a language analysis server of the third embodiment in accordance with the present invention.

In this embodiment, the language analysis module may not be set within the short message website-address device. The short message website-address device may be connected to an exterior language analysis server. As shown in FIG. 8, upon receiving the information from the SMS centre 500, the short message website-address analysis module 511 of the short message website-address device 510 sends the contents of the short message to the language analysis server 800; upon receiving the contents of the short message, the language analysis server 800 analyzes the contents of the short message and returns an analyzing result to the short message website-address analysis module 511 of the short message website-address device 510.

Figure 9:
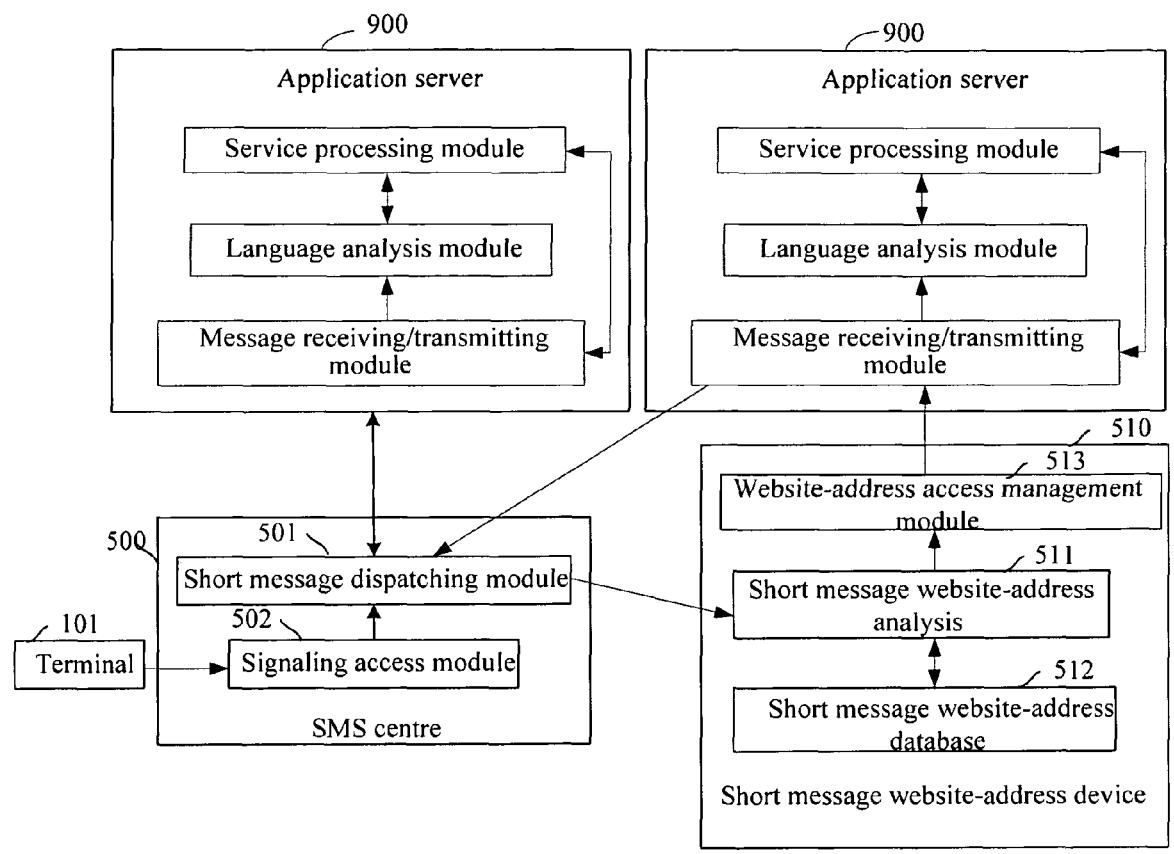
FIG. 9 is a schematic diagram illustrating the structure of a system where a language analysis module is added to an application server of the third embodiment in the present invention.

In this embodiment, a language analysis module also may be added to the application server to analyze the contents of the short message. As shown in FIG. 9, the application server 900 includes a service processing module 901 for determining a service processing logic and processing the service, a message receiving-transmitting module 902 for receiving and transmitting messages, and a language analysis module 903. Upon receiving a request message of accessing the short message website-address, the message receiving-transmitting module 902 sends the contents of the short message in the request message to the language analysis module 903 to be analyzed, and the language analysis module 903 sends the analyzing result to the service processing module 901 upon analyzing the contents of the short message, the service processing module 901 then determines a service processing logic according to the analyzing result from the language analysis module 903 and processing the service.

Figure 10:
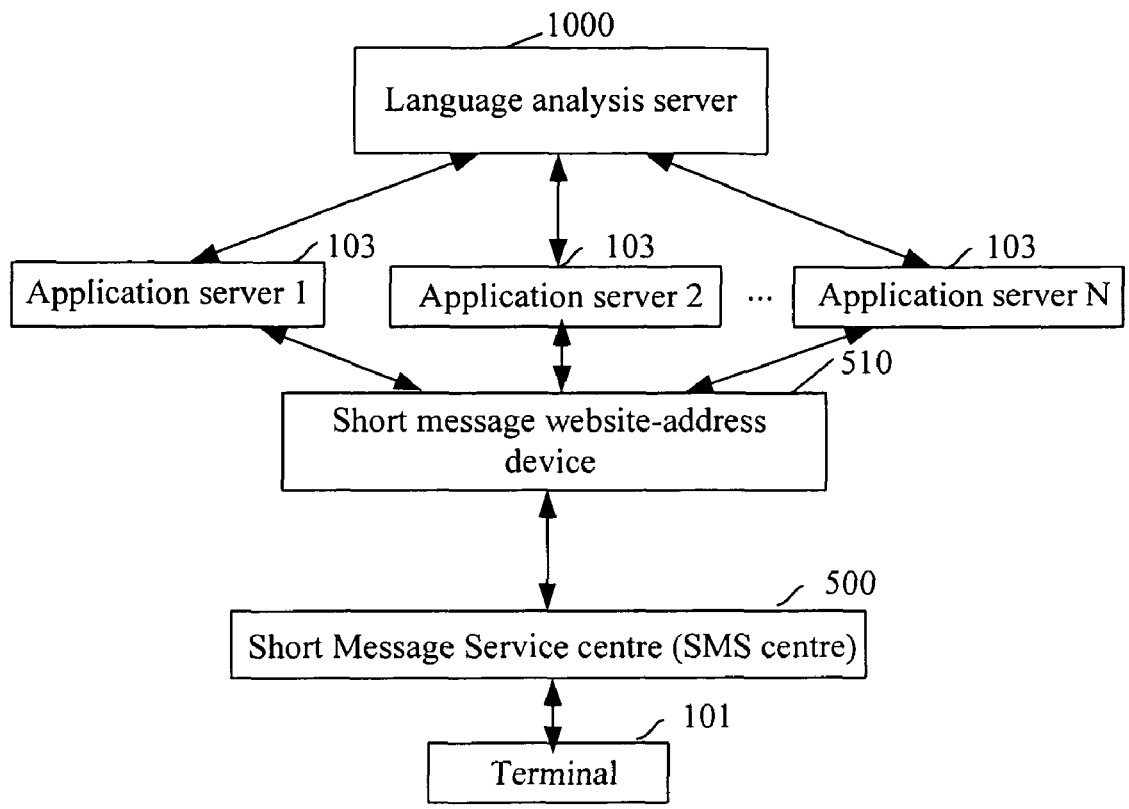
FIG. 10 is a schematic diagram illustrating the structure of another system having a language analysis server of the third embodiment in the present invention.

Alternatively, the language analysis module may not be added to the application server, instead, a language analysis server may be set separately to analyze languages, which is shown in FIG. 10. Words corresponding to service options of each short message website-address may be stored in the language analysis server 1000 in advance. Thus, upon receiving a request message of accessing the short message website-address, the application server 103 sends the language analysis server 1000 a language analysis task message, which may include the contents of the short message and an analysis purpose such as analyzing the short message website-address, or analyzing a service option or both of them. Additionally, if the analysis purpose is to analyze only the service option, short message website-address information corresponding to the service option should also be sent to the language analysis server 1000. Upon receiving the language analysis task, the language analysis server 1000 analyzes the contents of the short message according to the analysis purpose, and determines the short message website-address, or the service option, or both of them, and then returns information determined to the application server 103. For instance, the analysis purpose of the language analysis task received by the language analysis server is to analyze service options, and the contents of the short message are "ming tian ji nan tian qi zen me yang" in Chinese (means what about the weather tomorrow in Ji'nan in English) and the corresponding short message website-address is "tian qi yu bao" in Chinese (means weather forecast in English). The language analysis server determines that the service options are "ming tian" and "ji nan" in Chinese (means tomorrow and Ji'nan in English) according to the words preset in the language analysis for the short message website-address "tian qi yu bao" in Chinese (means weather forecast in English), and returns the information that the service options are "ming tian" and "ji nan" to the application server; upon receiving the information, the application server processes the service according to both the service options and the service processing logic corresponding to "tian qi yu bao" in Chinese (means whether forecast in English), and returns the processing result generated to the terminal.

The language analysis server may be set by the operator, which enables the operator to charge according to a record for using the language analysis service.

In the embodiments above, the information received by the application server from the short message website-address device and the processing result generated are all in a short message format. In order to enhance the attraction of the short message VAS to a user further, the application server may generate a processing result including contents in multimedia format and send the processing result generated including contents in multimedia format to the terminal via a multimedia message centre or a WAP gateway, which will be described through a fourth embodiment and a fifth embodiment.

Figure 11:
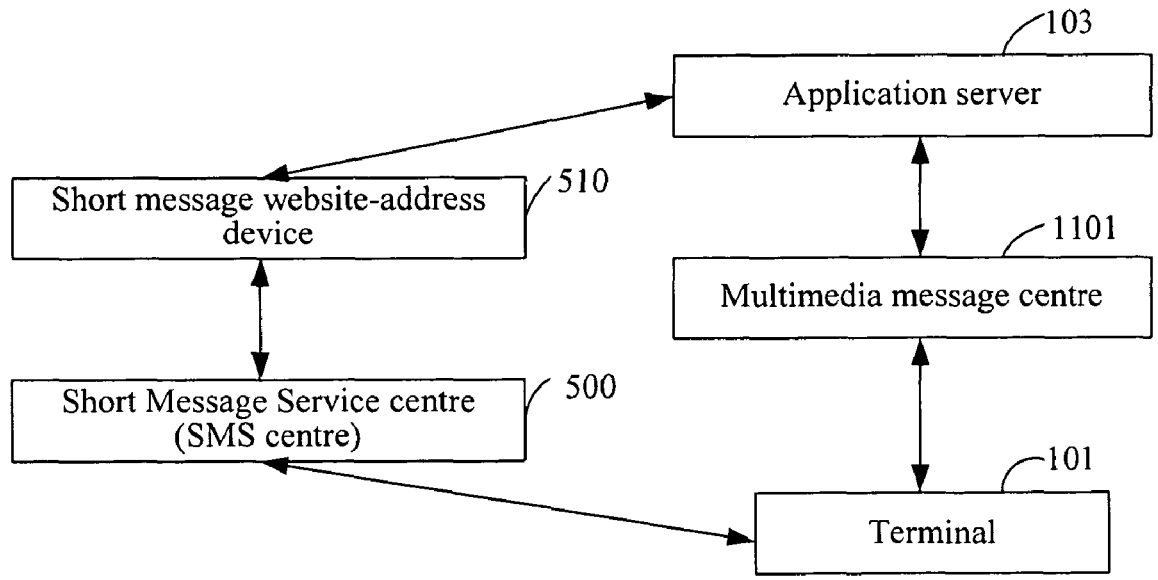
FIG. 11 is a schematic diagram illustrating the structure of a system of a fourth embodiment in the present invention.

The difference between the fourth embodiment of the present invention and the three embodiments mentioned above only lies in the processing result generated after an application server processes the service. A Multimedia Message Centre (MMC) is added to the system illustrated in the embodiments above. As shown in FIG. 11, the application server 103 in this embodiment generates a processing result including contents in multimedia format such as pictures, voices and the like during the processing the service according to the service processing logic, after which, the application server encapsulates the processing result into a multimedia message and sends the multimedia message to the MMC 1101 through an MM7 interface. Upon receiving the multimedia message from the application server, the MMC 1101 forwards the multimedia message to the terminal.

In this embodiment, the process for the application server generating a processing result in the multimedia format is implemented according to the service processing logic of the application server. The service processing logic may be developed by developers according to different service requirements, there is no more description. In addition, the process for forwarding the multimedia message via the MMC 1101 may be implemented by the common technology in the art.

Figure 12:
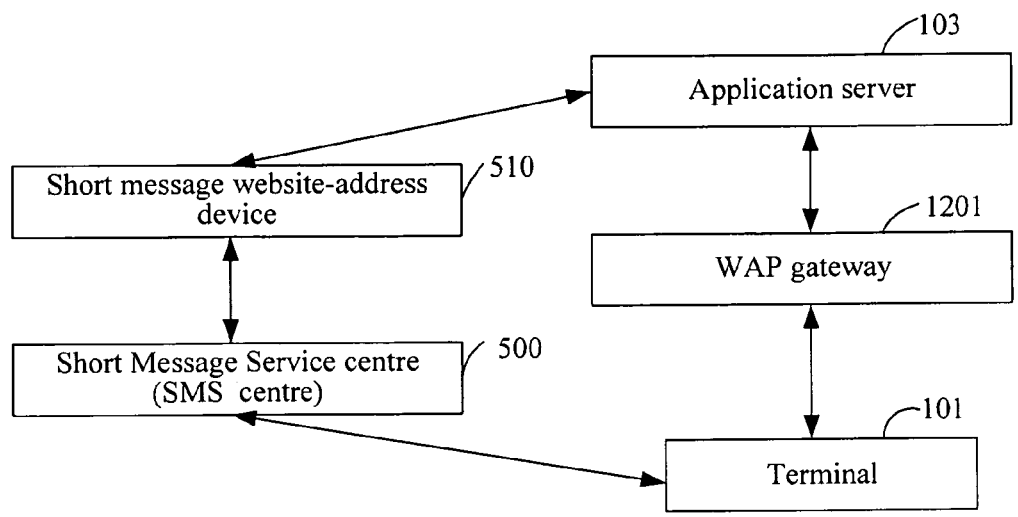
FIG. 12 is a schematic diagram illustrating the structure of a system of a fifth embodiment in the present invention.

Similar to the fourth embodiment, the fifth embodiment of the present invention is also based on the three embodiments above. As shown in FIG. 12, in this embodiment, a WAP gateway 1201 is added to the system illustrated in the second embodiment. During processing the service, if the information returned to the terminal is the processing result in a WAP webpage format, the application server 103 sends Uniform Resource Locator (URL) information corresponding to the processing result, such as a URL of a WAP webpage including company introduction information, to the terminal in a WAP PUSH short message format through the WAP gateway 1201. Upon receiving the WAP PUSH short message, the terminal reads the WAP PUSH short message, thus the embedded WAP browser of the terminal will access the URL by the WAP protocol to obtain the company introduction information.

In the fourth and fifth embodiments mentioned above, the application server sends the processing result to the terminal in a multimedia message format or a WAP PUSH message format. However, since not all existing terminals support multimedia messages and the WAP webpage browsing, a sixth embodiment in accordance with the present invention is provided, which will be described below.

Figure 13:
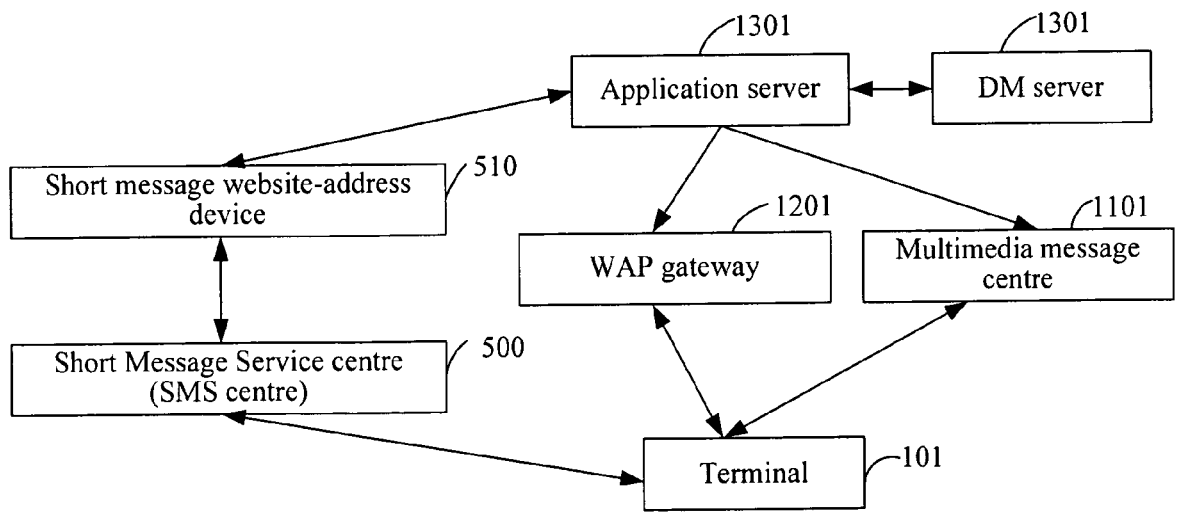
FIG. 13 is a schematic diagram illustrating the structure of a system of a sixth embodiment in the present invention.

As shown in FIG. 13, in the sixth embodiment of the present invention, upon determining to generate a processing result during processing the service according to a service processing logic, the application server 1301 sends an request message of inquiring about terminal capability that includes a terminal ID to be inquired to a Device Management (DM) server 1302 which has registered the terminal capability information. Upon receiving the request message of inquiring about terminal capability from the application server 1301, the DM server 1302 acquires about terminal capability information corresponding to the terminal ID in the request message of inquiring about terminal capability, such as whether the terminal supports a multimedia message and WAP, the picture resolution supported by the terminal and the like, and returns the terminal capability information to the application server 1301. Upon receiving the terminal capability information from the DM server 1302, the application server 1301 determines a type of the message returned to the terminal, specific parameters in the contents of the message and the like according to the terminal capability information, and returns the processing result to the terminal. The determining method may be to select the processing result with the highest format corresponding to the terminal capability, and the sequence of the formats above for the processing result from higher to lower may be as follows:

a multimedia format, the method corresponding to which for returning a processing result is sending a multimedia message to the terminal via the MMC; a webpage format, the method corresponding to which for returning a processing result is sending a URL to the terminal using a WAP PUSH message through the WAP gateway; a text format, the method corresponding to which for returning a processing result is sending a short message via the SMS centre.

In addition, in the multimedia format, there may be different formats for the processing result. For example, upon processing the information received according to a certain service processing logic, the application server determines to generate a processing result which may be in a text format, picture format or webpage format. The picture may have a variety of size formats, such as 220*220, 110*10 and etc. After the application server 1301 requests the DM server for the terminal capability information, the terminal capability information is that the terminal supports WAP and multimedia information and the screen resolution is 220*320. The service processing logic determines that the processing result of the highest format corresponding to the terminal capability supported by the terminal is a picture of which the size is 220*220, and the service processing logic generates a multimedia message including a picture of which the size is 220*220. The structure of the application server in accordance with this embodiment may be the same as that of the application server in the related art or the same as that of the application server shown in FIG. 9.

In the fourth, fifth and sixth embodiments in accordance with the present invention, upon generating the processing result and determining the format of the processing result, the application server may also send the processing result and the format of the processing result to the short message website-address device in the SMS centre or the website-address access management module in the short message website-address device. Upon receiving the processing result and the format of the processing result, the short message website-address device in the SMS centre or the website-address access management module in the short message website-address device encapsulates the processing result into a message according to the format of the processing result and sends the message to an appropriate server. For example, if the format of the processing result is a short message format, the processing result will be encapsulated into a short message to be sent to the SMS centre. If the format of the processing result is a multimedia message format, the processing result will be encapsulated into a multimedia message to be sent to the MMC. If the format of the processing result is a WAP PUSH short message format, the processing result will be encapsulated into a WAP PUSH short message to be sent to the SMS centre.

In an actual communication system, an operator generally sets an Internet Short Message Gateway (ISMG) in a network. The SMS centre communicates with the exterior of the operator network which is generally an application server of a Service Provider (SP) on the Internet through the ISMG. And the ISMG provides a secure, quick and convenient channel for data switching between the application server and the SMS centre, and performs such functions as charging collection, service management, and network management. A system including an ISMG to implement short message VASs, and a method of implementing short message VASs based on the system will be described through a seventh embodiment below.

Figure 14:
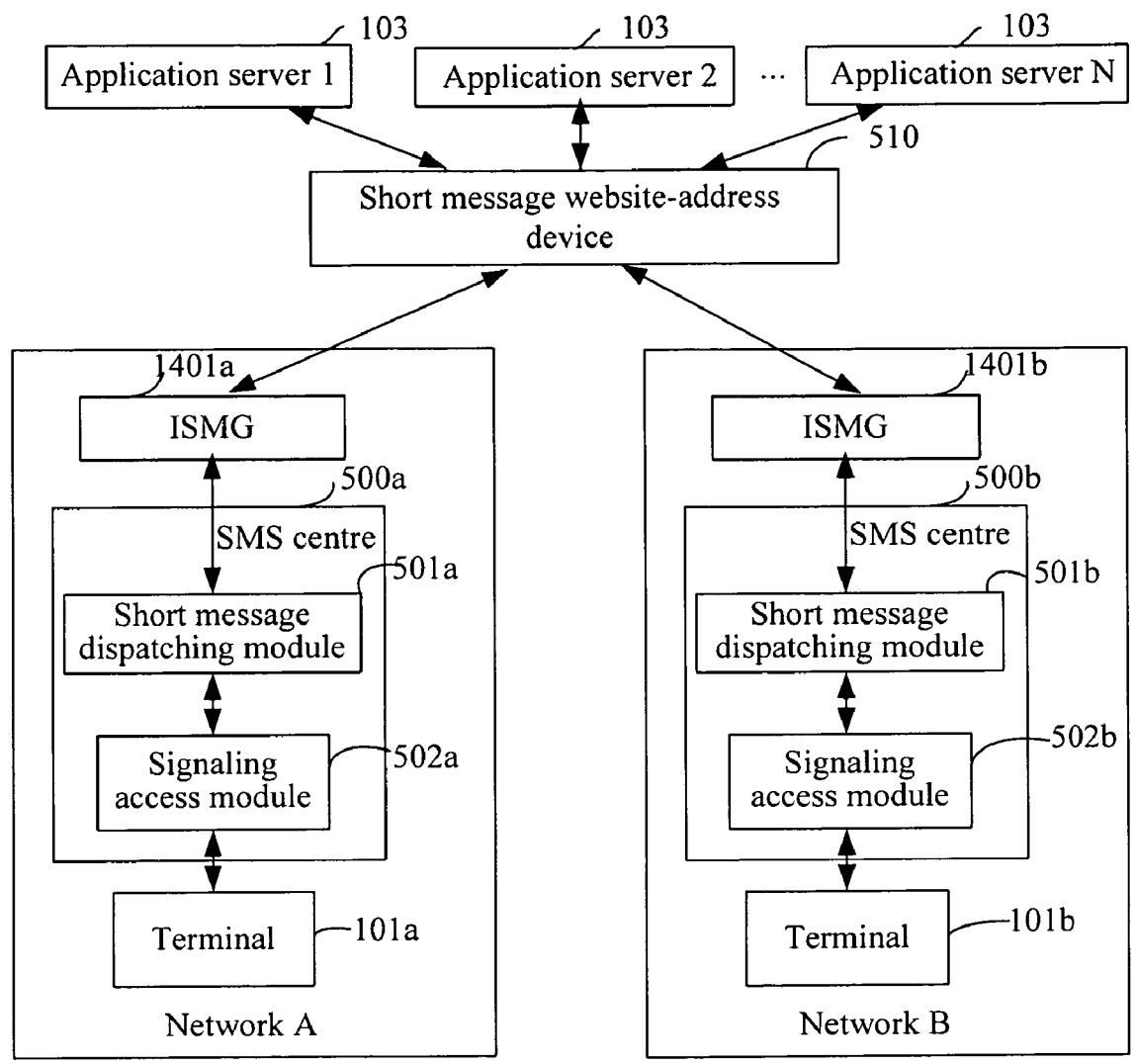
FIG. 14 is a schematic diagram illustrating the structure of a system of a seventh embodiment in the present invention.

The structure of the system in accordance with the seventh embodiment is shown in FIG. 14. The system includes two operator networks, Network A and Network B, and each SMS centre in the Network A and Network B is connected to the short message website-address device 510 through ISMGs 1401a and 1401b respectively. This embodiment and an eighth embodiment below just take the system including two operator networks as an illustrative example, in actual applications, the system may also include more than two operator networks and the implementation may refer to the system in which there are two operator networks.

In this embodiment, the internal structures of the SMS centre 500 and the short message website-address device 510 are the same as that in accordance with the second embodiment.

Information interaction in Network A is put forward to describe the difference between this embodiment and the second embodiment. Upon identifying that the recipient number in the information from the signaling access module 502a is a universal number corresponding to a short message VAS, the message dispatching module 501a in the SMS centre 500a sends the short message received to the ISMG 1401a by the SMPP protocol. Upon receiving the short message, the ISMG 1401a forwards the information in the short message to the short message website-address analysis module 512 in the short message website-address device 510 by the CMPP protocol or SGIP protocol. And the short message access management module 513 sends the information of the short message to the corresponding application server according to the short message website-address acquired by the short message website-address analysis module 512. The website-address access management module 513 sends the information in the short message to the application server according to the short message website-address determined by the short message website-address analysis module 512.

In this embodiment, upon processing the information received, the application server may return a response message, for example a CMPP_Deliver_Rep, to an ISMG via the short message website-address device or directly to the ISMG so as to notify the ISMG that it has received the service request form the terminal and processed the service. Thus, the ISMG generates a bill for the service upon receiving the response message.

In addition, different operators are related in this embodiment, and a protocol adopted by an operator is the protocol accepted inside its own network. However, as the short message website-address device is outside the operator network, protocols agreed upon in advance between the short message website-address device and the ISMG should be adopted, such as a CMPP protocol and a SGIP protocol, etc. Therefore, the short message website-address analysis module in the short message website-address device is also utilized to convert the format of the information received in different protocol format to the internal information format supported by the short message website-address.

A uniform interface protocol such as the HTTP protocol may be adopted between the short message website-address device and the application server, thus the website-address access management module is also used for converting the format of the information to the HTTP protocol format upon receiving the information from the short message website-address analysis module, and sending the information, after converted, to the application server.

In any other embodiment mentioned above, an ISMG may also be set, either between the SMS centre and the short message website-address device which is set separately, or between the SMS centre including the short message website-address device and the application server.

Figure 15:
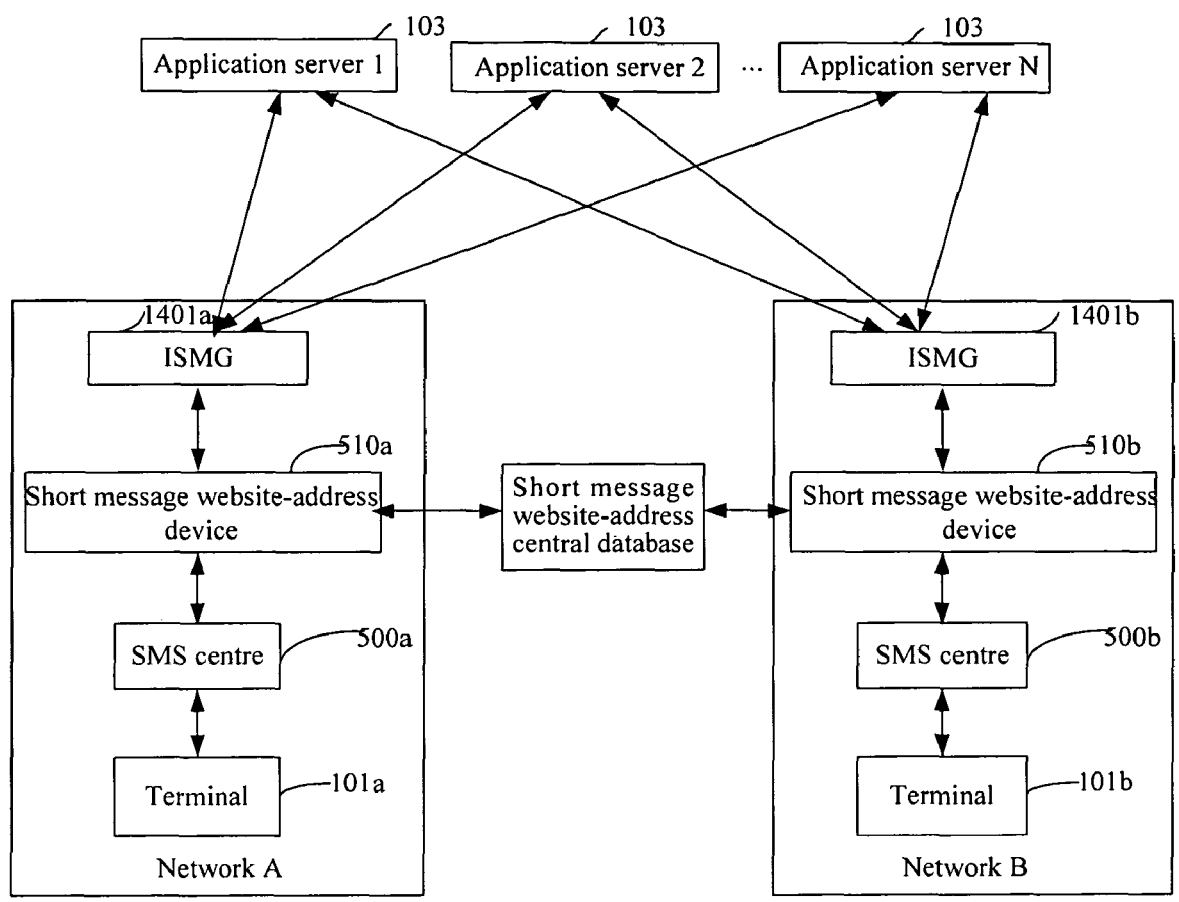
FIG. 15 is a schematic diagram illustrating the structure of a system of an eighth embodiment in the present invention.

In order to make the management from an operator to a short message website-address device more convenient, a short message website-address device may be set in each operator network, which will be described through the eighth embodiment below. As shown in FIG. 15, in the eighth embodiment in accordance with the present invention, short message website-address devices 1501a and 1501b are set respectively between the SMS centre and the ISMG in Networks A and B. The internal structures of the short message website-address device 1501a and 1501b are the same as those illustrated in the second embodiment.

In this embodiment, a short message website-address central database 1502 is further set separately outside the operator networks for storing short message website-address registration information. When registering the short message website-address, a Content Provider (CP) of a short message VAS stores the short message website-address registration information in the short message website-address central database 1502; the short message website-address central database 1502 sends the short message website-address registration information to the short message website-address devices 1501a and 1501b connected with the short message website-address central database 1502.

In this embodiment, similar to the seventh embodiment, upon processing the information received, the application server may generate and send a response message to an ISMG to notify the ISMG that it has received the service request corresponding to the terminal and processed the service. Upon receiving the response message, the ISMG generates a bill for the service.

In order to enhance the easy-to-use quality and attraction of short message VASs, embodiments of the present invention may further set a universal number of the short message VASs in the terminal and add a menu option of short message website-addresses to the terminal control panel or the menu of the operating system. When a user chooses the menu option, the terminal invokes and displays a short message editor to the user. And the short message editor provides an input or selection interface for the short message website-addresses and service options, some short message website-addresses and service options used usually could be embedded in the terminal for user's selections. After the user has edited the short message, the short message editor automatically configures the recipient number of the short message as the universal number corresponding to a short message VAS, and sends the short message to the SMS centre. Additionally, the terminal may further record the short message website-address set in the short message which is sent to the universal number corresponding to the short message VAS, when the terminal replies upon receiving the processing result of accessing the short message website-address, it automatically includes the website-address inputted or selected last time in contents of the short message replied. Thus the user needn't input the short message website-address manually again.

Furthermore, in accordance with embodiments of the present invention, a short message service management interface may be set in the short message website-address device and a WWW service process may be run at the short message website-address device. The operator or the register of the short message website-address then may send a request for inquiring about the access record of the short message website-address to the short message website-address device through the interface. Upon receiving the request, the short message website-address device returns the access record of the short message website-address to the operator or the register of the short message website-address in a WEB page format.

The foregoing descriptions are only preferred embodiments of the present invention and are not for use in limiting the protection scope thereof. All the modifications, equivalent replacements or improvements in the scope of the spirit and principles of present invention shall be included in the protection scope of the present invention.

What is claimed is:

1. A method for implementing a short message Value-Added Service (VAS), the method comprising:

sending, by a terminal, a short message with a recipient number to a Short Message Service (SMS) centre, wherein the recipient number is a universal number of the short message VAS:

sending, by the SMS centre, the short message to a short message website-address device which is set in the SMS centre or set separately after the SMS centre identifies that the recipient number in the short message is the universal number of the short message VAS:

determining, by the short message website-address device, whether a session has been established for the terminal;

if the session has not been established, establish a new session with a session ID and terminal information for the terminal, determine a short-message website-address according to short message contents of the short message and determine an application server address according to the short message website-address, add the short message website-address and the application server address to the new session, and send the short message and the short message website-address to an application server by a request message of accessing the short message website-address;

otherwise, if the session has been established, determine, by the short message website-address analysis module, whether the short message website-address determined according to short message contents of the short message is the same as the short message website-address stored in the session, if the short message website-address determined according to short message contents is the same as the short message website-address stored in the session, determine the short message website-address in the session as the short message website-address in a request message of accessing the short message website-address, and send the short message and the short message website-address to an application server by the request message of accessing the short message website-address, if the short message website-address determined according to short message contents are different from the short message website-address stored in the session, determine the short message website-address and an application server address according to the short message contents, replace corresponding information in the session by the short message website-address and the application server address, and send the short message and the short message website-address to an application server by the request message of accessing the short message website-address; and determining, by the application server, a service processing logic according to the short message website-address in the request message of accessing the short message website-address; and processing a service according to the service processing logic;

upon determining a short message website-address according to the short message contents, determining, by the short message website-address device, a service option according to the short message contents; and upon determining a service processing logic according to the short message website-address in the request message of accessing the short message website-address, determining, by the application server, a service processing sub-logic of the service processing logic according to the service option;

determining, by the application server, whether a session has been established for the terminal according to terminal information in the request message of accessing the short message website-address;

if the session has not been established, establishing in the memory a new session with a session ID, terminal information, a short message website-address and a service option according to information in the request message of accessing the short message website-address; and determining a service processing logic;

otherwise, if the session has been established, determining, by the application server, whether the short message website-address received is the same as the short message website-address stored in the session;

if the short message website-address received is the same as the short message website-address stored in the session, adding the service option into the service option information of the session as a service sub-option of the service option of the session upon receiving the service option or determining the service option according to the short message contents, and determining the service processing logic;

otherwise, if the short message website-address received is different from the short message website-address stored in the session, replacing, by the application server, the short message website-address and the service option in the session by the short message website-address and the service option that are received and determining the service processing logic.

* * * * *